(No Model.) 2 Sheets—Sheet 1.
E. KEMPSHALL.
METHOD OF MAKING TWO PRONGED RIVETS.
No. 542,800. Patented July 16, 1895.
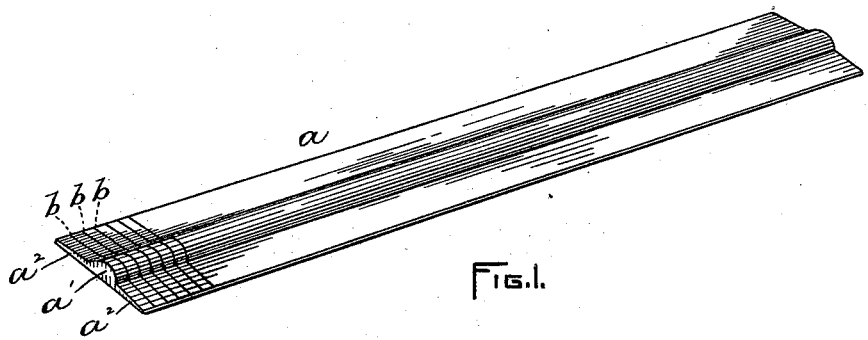
   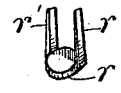
Fig.2.   Fig.3.   Fig.4.   Fig.5.
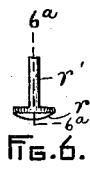 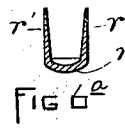 
Fig.6.   Fig 6ª.   Fig.7.
WITNESSES:
Louis B. Lamprey,
A. D. Harrison
INVENTOR:
Eleazer Kempshall.

(No Model.) 2 Sheets—Sheet 2.
E. KEMPSHALL.
METHOD OF MAKING TWO PRONGED RIVETS.
No. 542,800. Patented July 16, 1895.
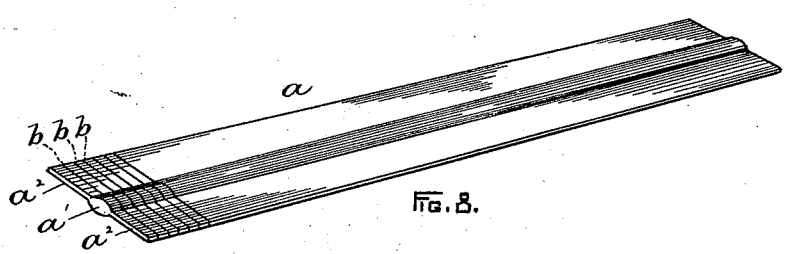
Fig. 8.
   
Fig. 9.    Fig. 10.    Fig. 11.    Fig. 12.
   
Fig. 13.    Fig. 14.    Fig. 15.    Fig. 16.
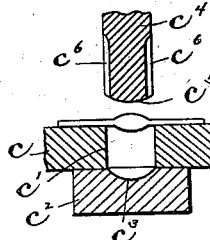 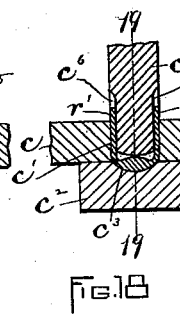 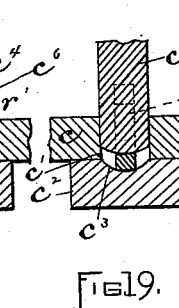 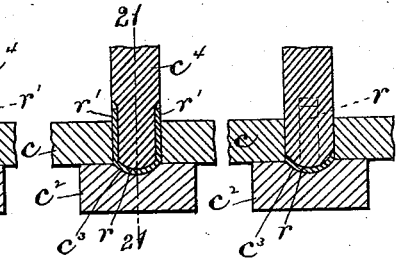
Fig. 17.    Fig. 18.    Fig. 19.    Fig. 20.    Fig. 21.
WITNESSES:          INVENTOR:
Louis B. Lamprey,          Eleazer Kempshall
A. D. Harmon.

UNITED STATES PATENT OFFICE.

ELEAZER KEMPSHALL, OF SHARON, ASSIGNOR TO THE BOSTON FAST COLOR EYELET COMPANY, OF BOSTON, MASSACHUSETTS.

METHOD OF MAKING TWO-PRONGED RIVETS.

SPECIFICATION forming part of Letters Patent No. 542,800, dated July 16, 1895.

Application filed April 13, 1895. Serial No. 545,654. (No specimens.)

*To all whom it may concern:*

Be it known that I, ELEAZER KEMPSHALL, of Sharon, in the county of Norfolk and State of Massachusetts, have invented certain new and useful Improvements in the Method of Making Two-Pronged Rivets, of which the following is a specification.

This invention relates to the manufacture of rivets having circular heads and side prongs, the width of the prongs being less than the diameter of the head.

My invention has for its object to produce a rivet of this class without waste of metal; and it consists in the improvements which I will now proceed to describe and claim.

Of the accompanying drawings, forming a part of this specification, Figure 1 represents a perspective view of a metal strip from which a series of blanks are to be cut in the process of making a pronged rivet. Fig. 2 represents a perspective view of one of the blanks. Fig. 3 represents a perspective view showing the central part of the blank laterally extended by pressure. Fig. 4 represents a perspective view of the blank, showing the prongs bent upwardly before the central part is extended. Fig. 5 represents a perspective view showing the completed rivet. Figs. 6 and 7 represent side views of said rivet. Fig. 6ª represents a section on the line 6ª 6ª, Fig. 6. Figs. 8 to 12, inclusive, represent views corresponding to Figs. 1 to 5, inclusive, showing a somewhat different form of blank. Figs. 13 and 14 represent side views of the rivet shown in Fig. 12. Fig. 15 represents a side view of a rivet having its prongs pointed. Fig. 16 represents a section on the line 16 16, Fig. 15. Figs. 17 to 21, inclusive, represent sectional views of the dies used in making my improved rivet, said figures showing different steps of the operation of making the rivet.

The same letters of reference indicate the same parts in all the figures.

In carrying out my invention I form, by rolling or otherwise, a bar or strip $a$, having a longitudinal thickened portion $a'$ and thin webs or flanges $a^2 a^2$ at opposite sides of said thickened portion. I then cut said strip transversely, as indicated at $b\ b$, into a series of blanks, each comprising a thickened central portion, from which the head $r$ of the rivet is afterward made, and two thinner portions or arms, from which the prongs $r'\ r'$ of said rivet are formed, the said blanks being of substantially-uniform width from end to end, as shown in Fig. 2. The flanges $a^2 a^2$ are preferably decreased in thickness from the thickened portion to the outer edges of said flanges, as shown in Figs. 1 and 2, this form adapting the outer ends of the prongs $r'\ r'$ to readily penetrate the material.

To convert one of the blanks described into a rivet, the blank is bent at the ends of the thickened central portion to form the prongs, and the said thickened portion is extended by pressure to convert it into a substantially-circular head of greater diameter than the width of the prongs. In performing these operations I prefer to employ the devices shown in Figs. 17 to 21, said devices comprising a female die $c$, having a cylindrical cavity $c'$, a bottom piece $c^2$, having a concave die $c^3$, which forms the bottom of the cavity $c'$, and a male die or plunger $c^4$, adapted to enter the cavity $c'$ and having a convex lower end $c^5$, adapted to co-operate with the die $c^3$ in forming the head of a rivet, as hereinafter described, the said die $c^4$ having slots $c^6 c^6$ in its sides to receive the prongs of the rivets during the bending operation. The blank is first laid across the mouth of the cavity $c'$, as shown in Fig. 17, and the die $c^4$ is then forced into said cavity, thus bending the prongs and forcing the thickened central portion down into the die $c^3$, as shown in Fig. 18. The thickened portion of the blank is narrower than the width of the die, as shown in Fig. 19, so that a continued downward movement of the die $c^4$, under sufficient pressure or force to displace the metal of the thickened portion, will expand said portion laterally, as shown in Fig. 21, and thus convert the thickened portion into a circular cup-shaped head, the margin of which is formed by the die $c$.

It will be seen that the operation of cutting the centrally-thickened bar or strip into blanks having parallel edges also forms the prongs of the rivets, no subsequent trimming away or removal of metal from the prongs being required. I therefore avoid any waste of metal, it being possible, as above described, to swage or expand the head to give it the desired form without trimming away any of its material.

I do not limit myself to the above-described order of the operations of bending and pressing the blank, as, if desired, the thickened central portion may be compressed to form the head before the prongs are bent, as indicated in Figs. 3 and 10.

In Figs. 8 to 16 I show a blank and a rivet made therefrom, in which the prongs are of uniform thickness from end to end instead of being tapered or reduced in thickness, as in the figures previously described.

The prongs may be tapered or decreased in width at their outer portions to form pointed ends, as shown in Fig. 15.

I am aware that two-pronged rivets have been made by swaging wire to simultaneously form the head and prongs, leaving a fin surrounding the whole, which fin is waste metal and has to be cut away; but my invention differs from this in that I form the prongs by the operation of cutting the blanks from the strip and by a subsequent operation form the head, the whole being accomplished without waste.

I am also aware that staples have been made by cutting a centrally-thickened strip or bar into transverse blanks; but in the manufacture of such staples the thickened central parts of the blanks have not been expanded or swaged to form a head of greater width than the prongs.

I claim—

That improvement in the art of making two-pronged rivets which consists in first cutting from a centrally thickened bar or strip a transverse blank with parallel edges and thereby shaping the prongs of the rivet, and then expanding or swaging the thickened portion of the blank and thereby shaping the head of the rivet.

In testimony whereof I have signed my name to this specification, in the presence of two subscribing witnesses, this 11th day of April, A. D. 1895.

ELEAZER KEMPSHALL.

Witnesses:
C. F. BROWN,
A. D. HARRISON.